United States Patent [19]
Deshpande et al.

[11] Patent Number: 5,893,103
[45] Date of Patent: Apr. 6, 1999

[54] METHOD OF RECONSTRUCTING A MANAGED INFORMATION TREE

[75] Inventors: Raj Deshpande; Timothy Gronkowski, both of Chicago; Kamo Shakhnazaryan, Palatine; Haneef Charania, Chicago, all of Ill.

[73] Assignee: Motorola, Inc., Schaumburg, Ill.

[21] Appl. No.: 853,607

[22] Filed: May 9, 1997

[51] Int. Cl.$^6$ .................................................. G06F 17/30
[52] U.S. Cl. .................... 707/101; 707/102; 707/103; 707/104; 364/251; 364/282
[58] Field of Search .................... 707/101, 102, 707/103, 104, 3, 4, 200, 8; 379/280; 364/251, 282, 283, 222, 224, 947; 395/726

[56] References Cited

U.S. PATENT DOCUMENTS

| | | | |
|---|---|---|---|
| 5,058,144 | 10/1991 | Fiala et al. | 707/102 |
| 5,153,591 | 10/1992 | Clark | 707/101 |
| 5,539,922 | 7/1996 | Wang | 707/104 |
| 5,557,786 | 9/1996 | Johnson, Jr. | 707/103 |
| 5,701,467 | 12/1997 | Freeston | 707/101 |

OTHER PUBLICATIONS

Robert L. Kruse, Data Structures & Program Design 379–384 (Prentice–Hall, Inc.) 1984.

*Primary Examiner*—Paul R. Lintz
*Assistant Examiner*—Thu-Thao Havan
*Attorney, Agent, or Firm*—Gregory B. Gulliver

[57] ABSTRACT

A method of rebuilding a managed information tree includes steps of retrieving a unique key (304); testing to determine if a parent of the unique key exists (308); and if the parent exists, creating a node (318).

10 Claims, 5 Drawing Sheets

METHOD OF RECONSTRUCTING A MANAGED INFORMATION TREE

FIELD OF THE INVENTION

This invention relates generally to communication networks, and more specifically to cable telephony networks.

BACKGROUND OF THE INVENTION

Managing a communications network, such as a cable telephony network, requires information about the network. For example, the configuration information about the devices that are part of the network is needed.

The management information required for the management of the network is maintained in a persistent database. During operation of the network, a copy of the persistent database is made and stored for quick access.

Network elements require specific information about their operation. This information is stored in a database in the network element. The information is stored and retrieved by using a managed information tree. A managed information tree (MIT) provides rapid access to the data. The MIT is created and modified as information is stored in the database.

The MIT can be lost. The current method of rebuilding the MIT is to build the tree top down.

This method is time consuming because of the number of cycles required to rebuild the tree.

Thus, a quicker method of rebuilding the MIT is needed.

DESCRIPTION OF THE DRAWINGS

Figure 1:
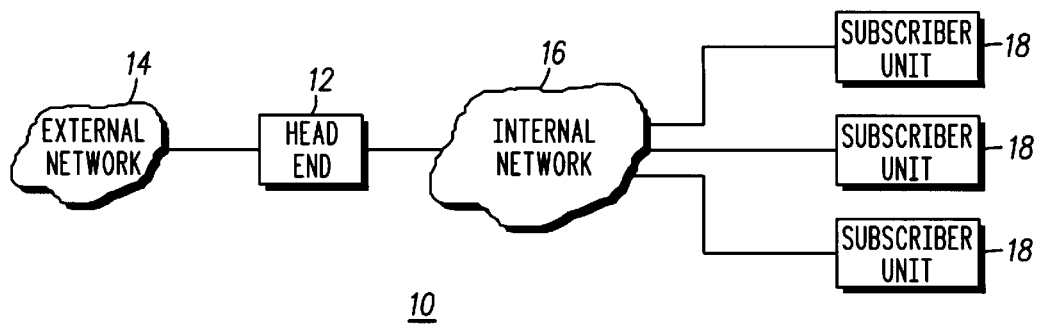
FIG. 1 shows a communication network.

FIG. 1 shows a communication network 10. Head end 12 is connected to external network 14. Head end 12 manages the internal network 16. Subscriber units 18 receive information from external network through internal network 16.

Figure 2:
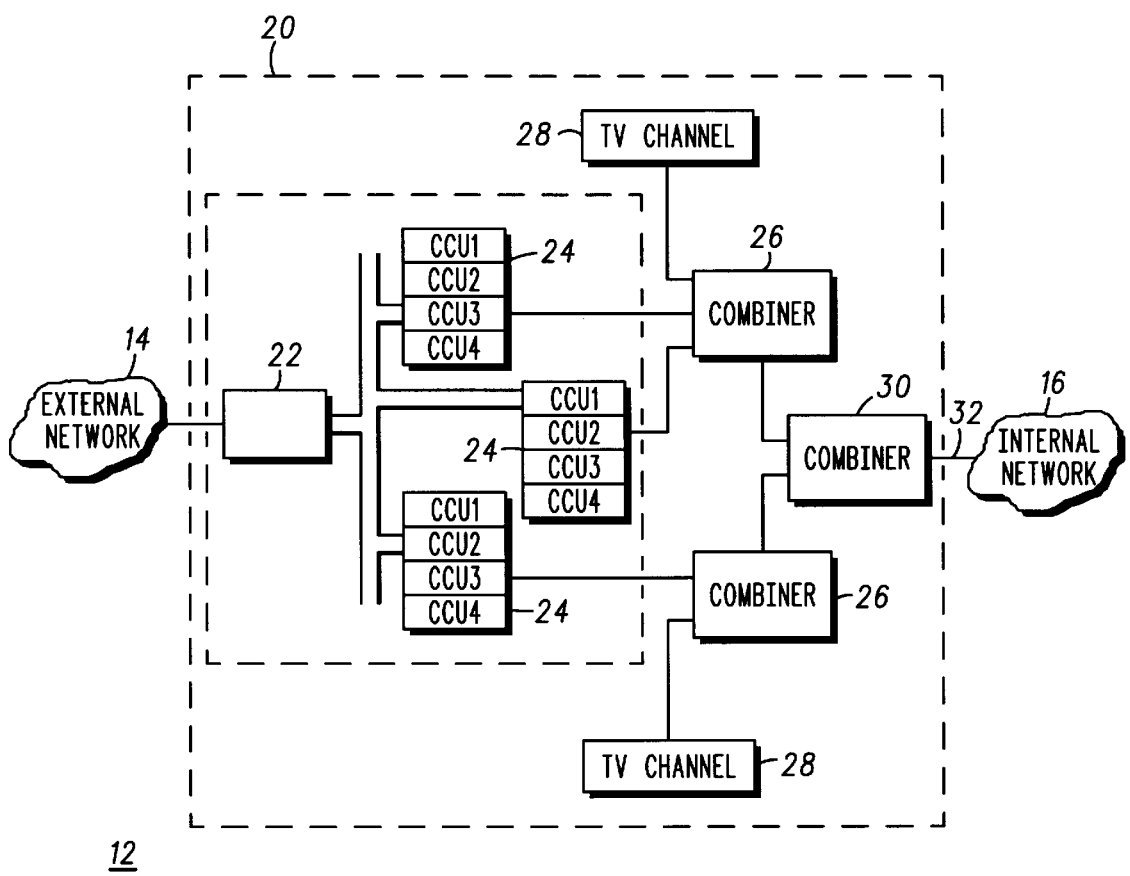
FIG. 2 shows head end.

FIG. 2 shows head end 12. Head end 12 contains telephony head end 20. Telephony head end 20 contains element manager 22, which could be a Unix workstation. Element manager 22 is connected to a plurality of frames 24 by, for example, and ethernet local area network.

The frames 24 are connected to combiners 26. Combiners 26 also may be connected to a television channel 28. The combiners 28 are then connected to a master combiner 30.

The master combiner 30 is connected to a cable 32, which is, in turn, connected to the internal network 16.

Each frame 24 is comprised of a plurality of network elements 34.

Figure 3:
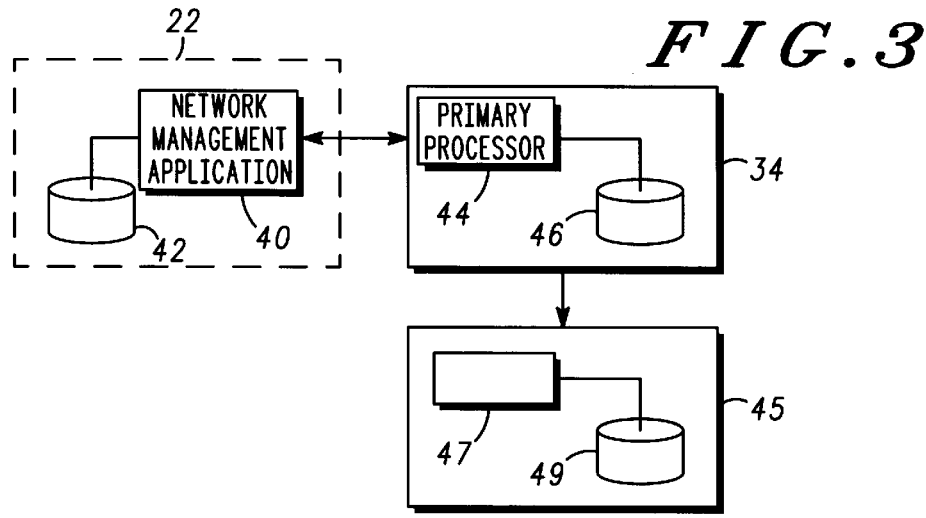
FIG. 3 shows a network element manager.

FIG. 3 shows a network element 34 coupled to an element manager 22. Element manager 22 has a network management application 40 and database 42. Database 42 is a persistent database. Database 42 contains the internal network 16 and subscriber unit 18 management information, such as configuration information, alarm information, and performance information.

Primary network element 34 contains a primary processor 44 and a primary run-time database 46. Primary network element 34 performs call control and network management. Network management includes performance management, resource management, and fault management. In order to perform these functions, primary processor 44 retrieves information from primary run-time database 46. Primary run-time database 46 contains configuration information, alarm information, and performance information. Primary run-time database 46 is non-persistent.

Secondary network element 45 acts as a backup for primary network element 34. Secondary network element 45 contains a secondary processor 47 and a secondary run time database 49. Primary network element 34 updates the standby run time database 49 whenever the run time database 46 is updated. Thus, a copy of the run time database is maintained in the secondary network element 45.

In case of a malfunction of primary network element 34, all functions are transferred to secondary network element 45, which then become the active network element. At any time, the element manager 22 communicates only with the active network element.

Figure 4:
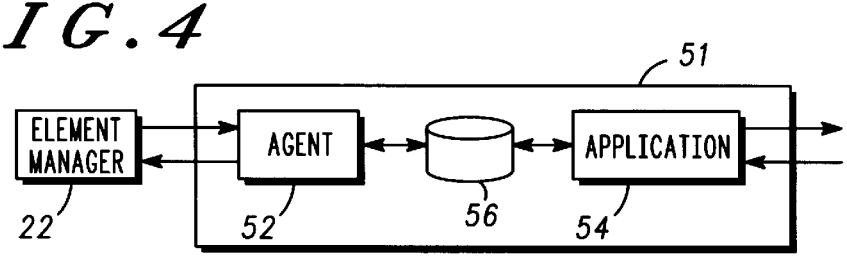
FIG. 4 shows a block diagram of the function of element manager and an active network element.

FIG. 4 shows a block diagram of the function of element manager 22 and an active network element 51. Element manager 22 sends information and instructions to active network element 51. Agent 52 receives the information and instructions. Agent 52 stores the information in run-time database 56. Application 54 retrieves the information from run-time database 56. Application 54 uses the retrieved information for call control and network management.

When the information is stored in the active run-time database 56, a data node is created. The data node is used by the agent 52 and application 54 to retrieve and update the data. The agent 52 stores information about the data node in a managed information tree (MIT) as a leaf.

Figure 5:
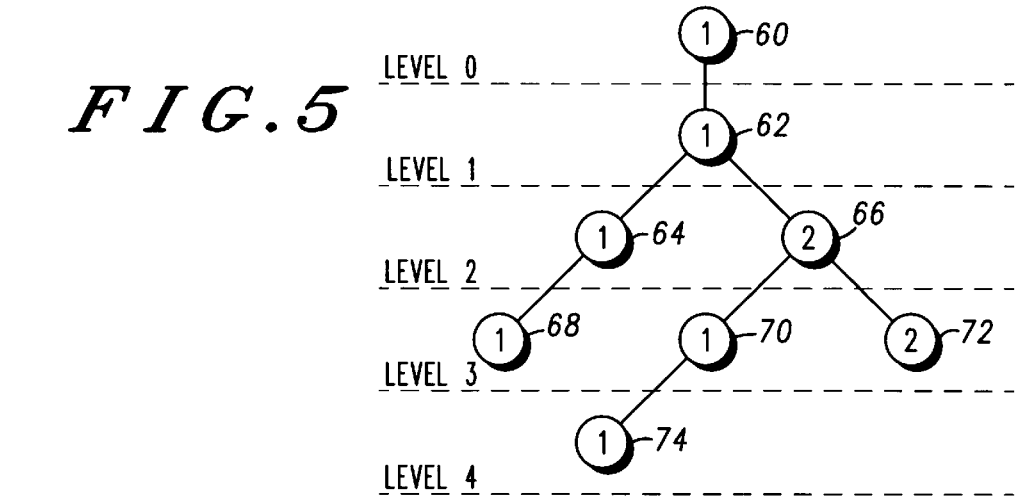
FIG. 5 shows a managed information tree (MIT).

FIG. 5 shows an MIT. The MIT is represented in a hierarchical form which contains a root node 60, branch nodes 62, 64, 66, 70 and leaf nodes 68, 72, 74. Each node 60, 62, 64, 66, 68, 70, 72, 74 represents a managed object and is identified by an instance ID (identifier). Each branch node 62, 64, 66, 70 and each leaf node 68, 72, 74 has an associated level which indicates the relationship of the node to the root node 60.

Name binding identifies a parent-child relationship in the MIT. Instance IDs are not unique within a level. Nodes are addressable by concatenating the instance IDs encountered along the branches leading to a specific node. For example, the ID of node 74 is 1:1:2:1:1. In addition, the name binding ID would be required to guarantee uniqueness.

The unique deterministic key (referred to as "unique key") for each node is derived from various parameters defined in the managed information base (MIB). The MIB defines the object classes and allowable instances of a particular class, and the relationship of the objects and their instances.

For example, for a dual line telephone, the MIB would define the line as a class, with two instances of the line class. The line would be a "line" child of the telephone.

The name binding branch ID is defined by identifying all unique parent-child relationships in the MIB. A unique sequential value is assigned for each such relationship in the MIB.

Figure 6:
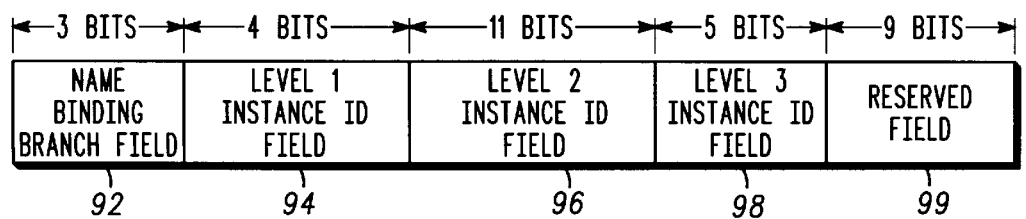
FIG. 6 shows the format for the unique key.

FIG. 6 shows the format for the unique key 90. The unique key 90 is 32 bits, in this example.

Name binding branch field 92 is 3 bits. The name binding branch field 92 contains the name binding branch ID. The name binding branch ID is defined by identifying all unique parent-child relationships in the MIB. A unique sequential value is assigned for each such relationship defined in the MIB.

The Level 1 instance ID field 94 contains the instance IDs for level 1. Level 2 instance ID field 96 is 11 bits, and contains the instance IDs for level 2. The Level 3 instance ID field 98 is 5 bits in length. The Level 3 instance ID field 98 contains the instance IDs for level 3. Finally, the reserved field 99 is reserved for any further levels or for enhancements to the unique key 90.

The length of any particular field in the unique key 90 could be changed as long as care is taken to insure sufficient bits to identify the level.

Figure 7:
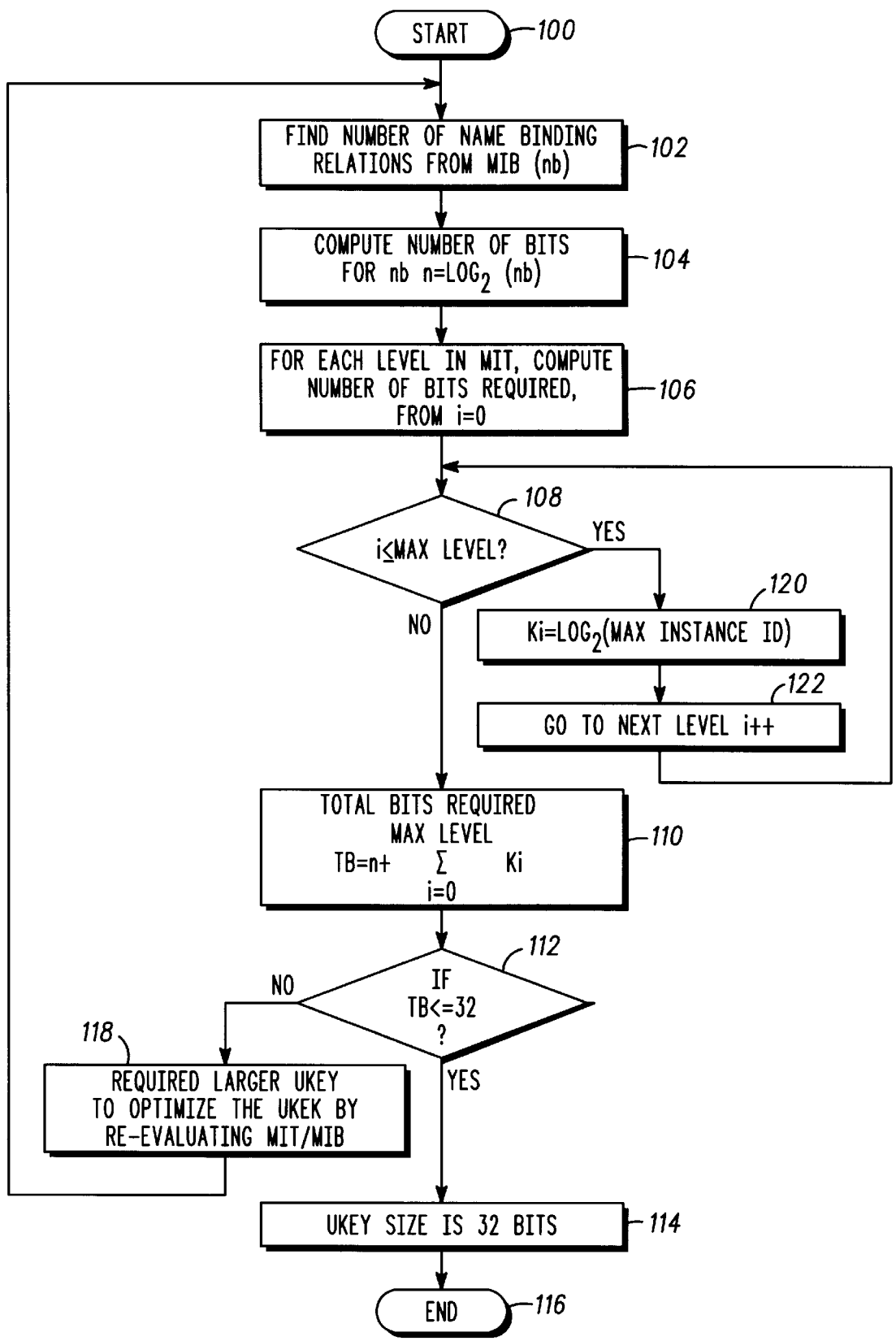
FIG. 7 is a flow chart showing a method to determine the size of the unique key.

FIG. 7 is a flow chart showing a method to determine the optimal size of the unique key 90 in accordance with the invention.

After start (block 100), the number of name binding relationships is determined (block 102). The number of bits for the name binding relationship is determine by the formula:

$$n = \log_2(nb)$$

where "n" is the number of bits and "nb" is the number of name binding relations (block 104).

For each level in the MIT, the number of bits required is computed, beginning with the "zero" level (block 106). The variable "i" is a counter of the levels of the MIT.

If the counter "i" is not greater than or equal to the maximum level (block 108), the total bits required is computed by the formula:

$$T_b = n + \sum_{i=0}^{i=MaxLevel} k(i) \quad \text{(block 110)}$$

If $T_b$ is less than or equal to processor size 32 bits (block 112), then the size of unique key 90 is set to 32 bits (block 114), and the process ends (block 116). If not, a larger unique key 90 is needed, and the MIT/MIB should be re-evaluated (block 118), and the process starts again.

Returning to block 108, if the counter "i" is less than or equal to the maximum level, then the number of bits for each level is computed by the formula:

$$K_i = \log_2(\text{Maximum Instance ID}) \quad \text{(block 120)}.$$

The counter "i" is incremented (block 122) and the process is repeated for the next level.

Figure 8:
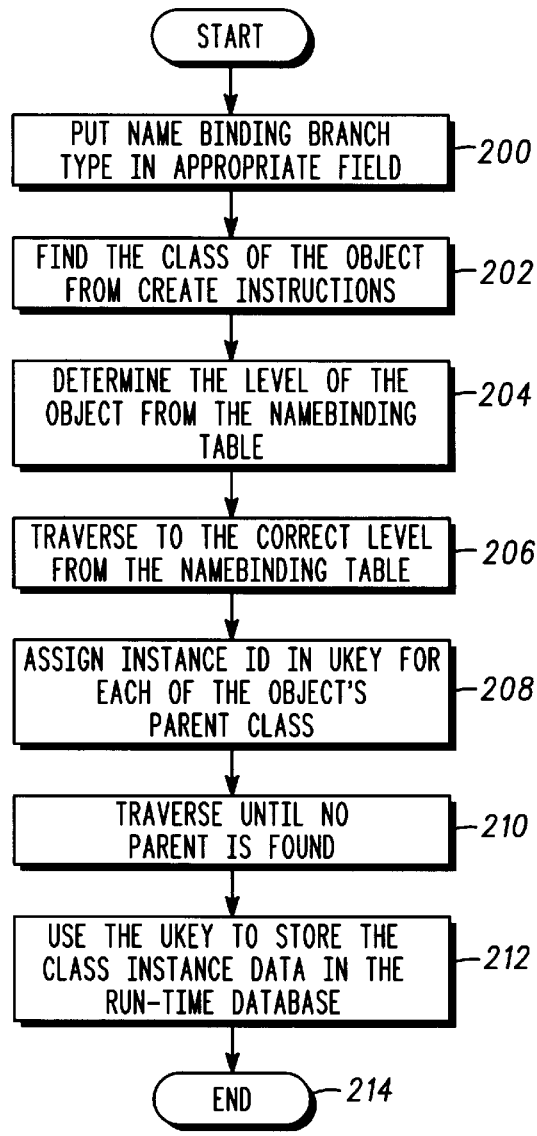
FIG. 8 shows a method of assigning a unique key for an object class instance.

FIG. 8 shows a method of assigning a unique key 90 for an object class instance (which is a leaf in the MIT). The method starts (block 200). The class of the object is found (block 202) by referring to the branch type table. The level of the object is determined from the namebinding table (block 204). From the namebinding table, the correct level is determined (block 206). A unique instance ID for unique key 90 is determined for each of the object's parent class (block 208). The traverse continues until no parent is found (block 210). The unique key 90 is then used to store the class instance data in the run-time database (block 212), and the process ends (block 214).

Figure 9:
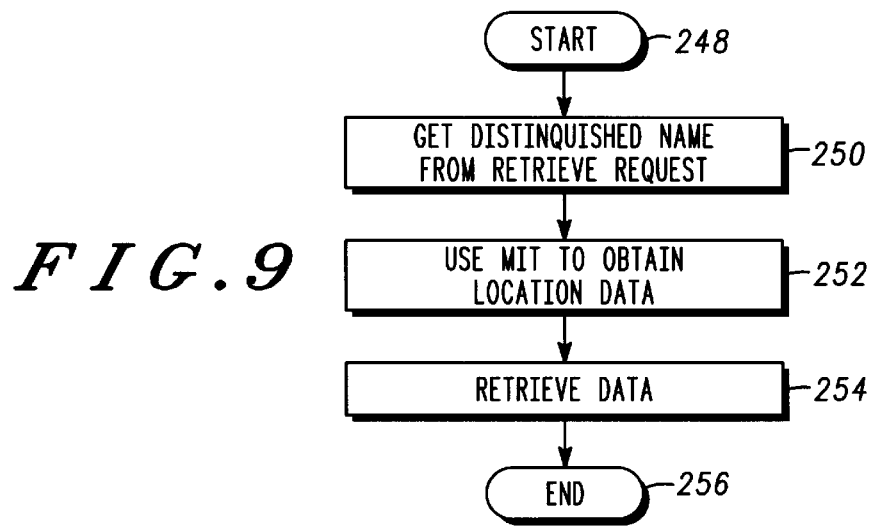
FIG. 9 shows a method for retrieving data from a run-time database.

FIG. 9 shows a method for retrieving data from the RTDB. The manager sends a request to the agent for data. The request contains the name. The method then starts (block 248). The agent gets the distinguished name (block 250). The agent uses the name and the MIT to determine the unique key 90 for the data (block 252). The unique key 90 is then used to retrieve the data using known data retrieval methods (block 254), and the process ends (block 256).

As may happen in any system, the primary network element 34 may malfunction. At that time, secondary network element 45 becomes the active network element. However, the MIT does not exist in the secondary network element 45. Therefore, the MIT must be rebuilt by the secondary network element 45.

Figure 10:
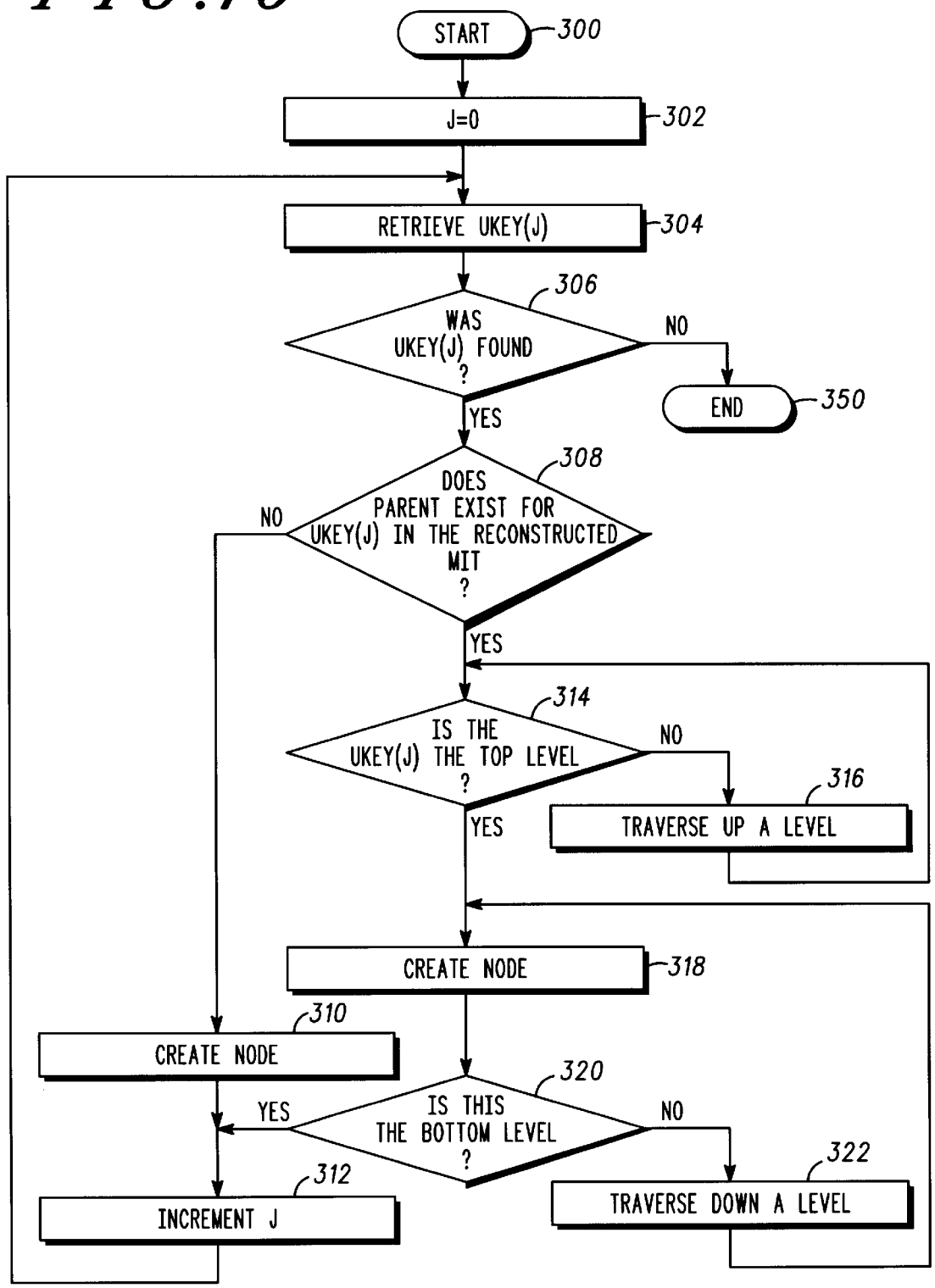
FIG. 10 shows a method for rebuilding the managed information tree.

FIG. 10 shows a method for rebuilding the MIT. After the method starts (block 300), a counter "J" is set to zero (block 302). The unique key for counter "J" (referred to in FIG. 10 as "UKey(j)") is retrieved (block 304). A test is then performed to determine if a unique key was, in fact, found (block 306).

If no unique key is found, the process terminated (block 350).

If a unique key was found, the unique key is tested to determine if a parent exists. If so, then the node is created (block 310), the counter "J" is incremented (block 312), the subsequent unique key is retrieved, and the process repeats.

If a parent does not exist, then a test is performed to determine whether the UKey(j) is at the top level (block 314). If UKey(J) is not at top level, then traverse up a level (block 316), and the process continues until the top level is reached. When the top level is found, a node is created (block 318).

A test is performed to determine if the node is at the bottom level (block 320). If the node is not at the bottom, then the tree is traversed down a level ( block 322 ). A node is created (block 318). The process continues until the bottom level is reached, at which time the counter "J" is incremented (block 312) and the process repeats.

This method of rebuilding the MIT can be done very quickly. Each unique key is retrieved and the tree is rebuilt in a straightforward process. Unlike other methods, no recursion is necessary. Thus, the transition from the primary network element to the secondary network element can be done quickly and efficiently, thereby reducing the interference in network operation caused by the failure of a network element.

What is claimed is:

1. A method of transferring a copy of an information tree database in a first memory in a first computer to a second memory in a second computer, the information tree database having a managed information tree definition, a managed information base definition, at least one bottom level node and a top level node, comprising the steps of:

retrieving a random node in a information tree database having a unique key, the unique key representing a name binding branch ID and at least one level instance;

creating the random node in the second memory in the second computer;

testing to determine if a parent node of the unique key exists; and if the parent exists, creating the parent node.

2. The method of claim 1 further comprising:

testing for whether the bottom level was reached.

3. The method of claim 2 further comprising:

if the bottom level was not reached, then traversing down a level;

creating a node; and testing whether the bottom level was reached.

4. The method of claim 1 further comprising:

if no parent exists:
   creating the parent node in the second computer memory;
   and retrieving a subsequent unique key.

5. The method of claim 4 further comprising:

when a root is found, creating a node.

6. The method of claim 5 further comprising:

prior to retrieving the unique key, testing whether a unique key exists.

7. The method of claim 6 further comprising:

testing whether the unique key is at the top level.

8. The method of claim 7 further comprising:

if the unique key is not at the top level, then traversing up a level.

9. A method of transferring a copy of an information tree database in a first memory in a first computer to a second memory in a second computer, the information tree database having a managed information tree definition, a managed information base definition, at least one bottom level node and a top level node, comprising the steps of:

testing whether a unique key exists;

retrieving a random node in a information tree database having a unique key, the unique key representing a name binding branch ID and at least one level instance;

determining whether a unique key was retrieved;

creating the random node in the second memory in the second computer;

testing to determine if a parent node of the unique key exists; and if the parent node exists, creating the parent node in the second memory in the second computer.

10. The method of claim 9 wherein the first computer memory is in a first computer and the second computer memory is in a second computer.

* * * * *